United States Patent
Cha et al.

(10) Patent No.: US 9,397,978 B1
(45) Date of Patent: Jul. 19, 2016

(54) CLOUD TO LOCAL ROUTER SECURITY

(71) Applicant: Western Digital Technologies, Inc., Irvine, CA (US)

(72) Inventors: Derek Hee Jun Cha, Irvine, CA (US); Paul Chen, Huntington Beach, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 130 days.

(21) Appl. No.: 13/724,875

(22) Filed: Dec. 21, 2012

(51) Int. Cl.
*H04L 29/06* (2006.01)

(52) U.S. Cl.
CPC ........ *H04L 63/0236* (2013.01); *H04L 63/0227* (2013.01); *H04L 63/0876* (2013.01); *H04L 63/10* (2013.01)

(58) Field of Classification Search
CPC .. H04L 63/10; H04L 63/0227; H04L 63/0876
USPC .......................................................... 726/11
See application file for complete search history.

(56) References Cited

U.S. PATENT DOCUMENTS

| | | | |
|---|---|---|---|
| 6,233,618 B1 * | 5/2001 | Shannon ....................... 709/229 |
| 6,304,973 B1 | 10/2001 | Williams |
| 6,606,659 B1 | 8/2003 | Hegli et al. |
| 6,934,841 B2 | 8/2005 | Boyles et al. |
| 6,947,985 B2 | 9/2005 | Hegli et al. |
| 6,976,070 B1 | 12/2005 | Hoashi et al. |
| 6,990,527 B2 | 1/2006 | Spicer et al. |
| 7,194,464 B2 | 3/2007 | Kester et al. |
| 7,650,420 B2 | 1/2010 | Chong et al. |
| 7,725,458 B2 | 5/2010 | Urakawa et al. |
| 7,774,483 B1 * | 8/2010 | Ravindranath ................. 709/229 |
| 7,873,656 B1 * | 1/2011 | Soubramanien ............... 707/770 |
| 8,015,174 B2 | 9/2011 | Hubbard |
| 8,135,831 B2 * | 3/2012 | Sinclair et al. ................. 709/224 |
| 8,161,068 B2 | 4/2012 | Urakawa et al. |
| 2003/0110168 A1 * | 6/2003 | Kester et al. ....................... 707/6 |
| 2005/0021978 A1 * | 1/2005 | Bhat et al. ...................... 713/182 |
| 2005/0138204 A1 * | 6/2005 | Iyer et al. ....................... 709/242 |
| 2006/0031504 A1 * | 2/2006 | Hegli et al. .................... 709/225 |
| 2007/0199064 A1 * | 8/2007 | Pueblas ........................... 726/13 |
| 2007/0271220 A1 * | 11/2007 | Carter .............................. 707/2 |
| 2008/0244074 A1 * | 10/2008 | Baccas et al. .................. 709/227 |
| 2010/0058446 A1 * | 3/2010 | Thwaites .......................... 726/4 |
| 2011/0231890 A1 | 9/2011 | Tovar |
| 2011/0231892 A1 | 9/2011 | Tovar |
| 2012/0221627 A1 | 8/2012 | Sainio et al. |

FOREIGN PATENT DOCUMENTS

| | | |
|---|---|---|
| EP | 1622332 | 2/2006 |
| WO | 0223343 | 3/2002 |
| WO | 2005071518 | 8/2005 |

* cited by examiner

*Primary Examiner* — Dede Zecher
*Assistant Examiner* — Jason C Chiang (57) ABSTRACT

A router may be configured to receive a request for a Uniform Resource Locator (URL) from a uniquely-identified client device coupled to the router; send the received URL to a first remote site over a computer network; receive, from the first remote site, a value to which the first remote site has associated the URL; determine whether the received value is sufficient to allow the uniquely-identified client device to access the URL; and allow the uniquely-identified client device to access the URL if the received value is determined to be sufficient and disallow access to the URL by the uniquely-identified client device if the received value is determined not to be sufficient.

28 Claims, 5 Drawing Sheets

CLOUD TO LOCAL ROUTER SECURITY

BACKGROUND

Conventionally, parents, educators or other responsible persons wishing to control a child's access to the Internet are reduced to taking the child's computer or mobile device away or installing and configuring client-side parental-control software on the child's computer or mobile device to only allow access to certain websites at specified times. Unfortunately, such client-side parental-control software is easily circumvented by tech-savvy children. Indeed, the software may be disabled by removing the software, returning the computer or mobile device to its factory configuration, and other techniques. This renders the parent's job difficult and requires a great deal of day-to-day involvement on the parent's part, rendering such client-side parental-control software less than practical or easy to use, in most cases. Also, devices such as game consoles typically are closed systems that do not allow the end-user to install parental-control software.

Another way to limit a child's access to the Internet is to physically disable the router and/or modem when access is to be disallowed. However, this also prevents all other users from accessing the Internet.

What are desired, therefore, are methods and devices that would enable a parent, guardian or other responsible party to effectively limit and control a child's access to the Internet, in terms of content viewed and sites visited and also in terms of when such access is to be allowed. Such methods and devices should not require the installation and maintenance of client-side parental-control software and should be effective to apply selectable and robust access restrictions to all or selected devices accessing the Internet. Finally, such methods and devices should be relatively tamper-proof by children and should allow flexibility in setting and changing the allowable content and sites, as well as the number of hours or minutes the child is to be allowed to access the Internet.

DETAILED DESCRIPTION

Figure 1:
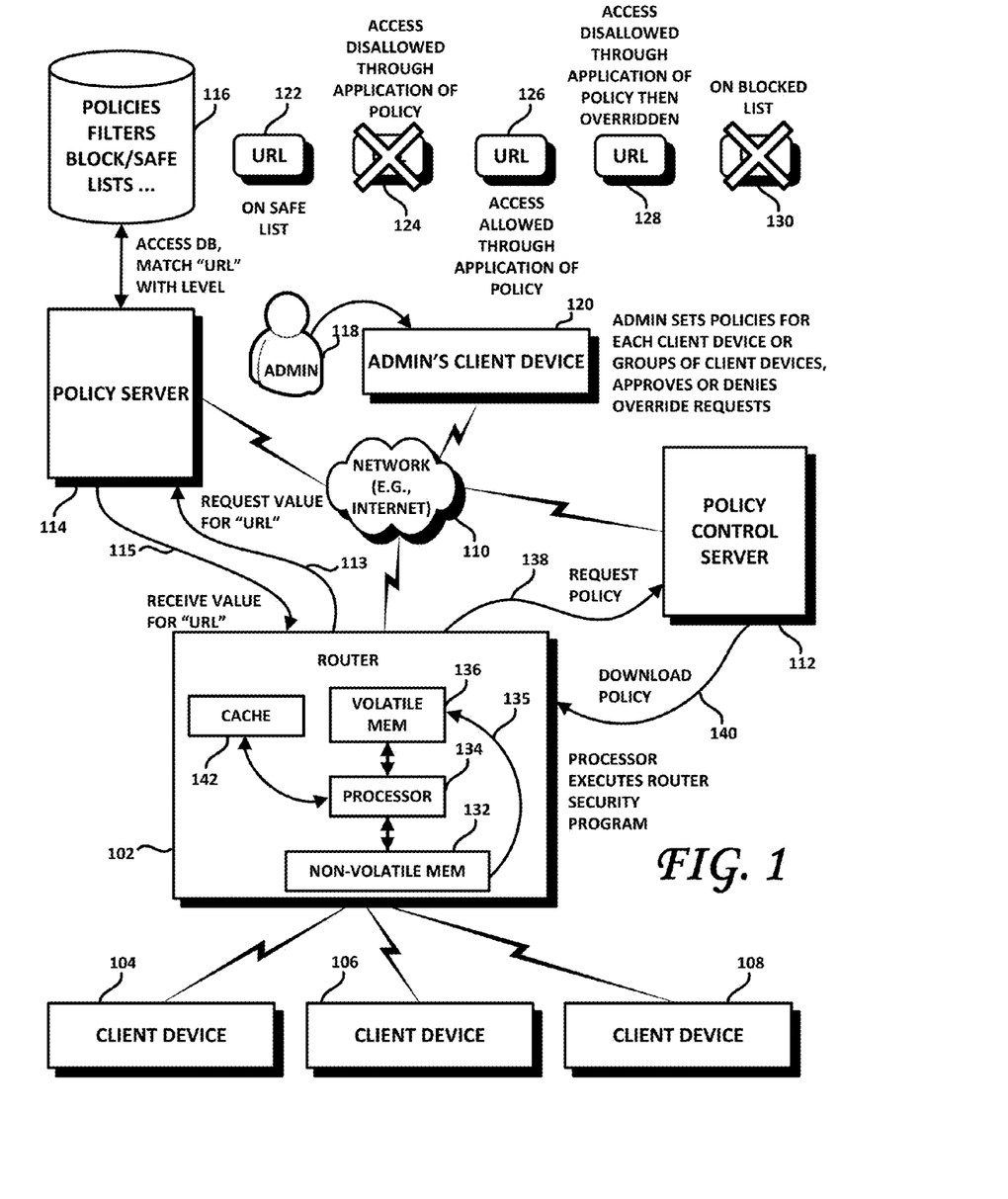
FIG. 1 shows a router according to one embodiment and an environment in which the router may be used.

FIG. 1 shows a router according to one embodiment and an environment in which the router may be used. As shown therein, the router 102 may comprise a processor 134. The processor 134 may be coupled to a non-volatile memory 132 and to a volatile memory 136. According to one embodiment, the non-volatile memory 132 may be configured to store a plurality of computer-readable instructions which, when executed by the processor 134, configure the router according to one embodiment. Upon application of power and subsequent startup of the router 102, instructions stored within the non-volatile memory 132, as suggested at 135, may be loaded into the working, volatile memory 136 of the router. The processor 134, thereafter, may be configured to access and execute such instructions to enable the functionality disclosed herein. As shown, one or more of a plurality of client devices 104, 106 and 108 may be coupled to the router 102. Such client devices 104, 106, 108 may be, for example, computers, mobile devices, smart phones, game consoles and the like. Moreover, such client devices 104, 106, 108 may belong to children or other individuals whose access to the Internet is desired to be controlled by a responsible party 118 such as, for example, a parent, guardian or educator for example.

One embodiment comprises implementing controls (hereinafter collectively referred to as "parental controls") through the router 102, which is the single point of access across devices within a home or other (e.g., school) network. Indeed, according to one embodiment and in operation, the router 102 may receive a request for a URL from a client device 104, 106, 108 coupled to the router 102. Each of the client devices 104, 106, 108 may be uniquely identified or identifiable. The router 102 may then send the received URL to a first remote site, over a computer network comprising, for example, the Internet. The sending of the URL to the remote site may constitute, according to one embodiment, a request for a value to be returned, as shown at 113. With reference to FIG. 1, the first remote site may comprise a policy server, as shown at 114. The policy server 114 may be coupled to a repository or database 116 of policies, filters, block and safe lists and the like. Responsive to the receipt, by the policy server 114 of the URL to which access is requested by one of the client devices 104, 106, 108, the policy server 114 may return and the router 102 may receive, as shown at 115, a value that the policy server 114 has associated with the URL. After having received the value associated with the requested URL, the router 102 may then determine whether the received value is sufficient to allow the URL-requesting client device to access the URL. The router 102 may then allow the client device to access the URL if the received value is determined, by the router 102, to be sufficient. Conversely, the router 102 may disallow access to the URL by the client device if the received value is determined, by the router 102, not to be sufficient.

According to one embodiment, the value received by the router 102 from the policy server 114 may be tested to determine whether it is associated with an allowed or disallowed URL or category of URLs, at least for the uniquely-identified client device having requested access thereto. For example, the value returned by the policy server 114 may be characterized as a Level. Different levels may be associated with different URLs, categories and/or different content. For example, a URL associated with Level 3 may point to a social media website or a website featuring violence, to which the child operating the requesting client device may not be allowed to access. Likewise, a URL associated with Level 2 may point a casual gaming website, to which the child may be allowed access only during a predetermined time window. Similarly, a URL that was associated by the policy server 114 with a Level 1 may point to a website that may be an educational website that the child may most always be allowed to access. A URL associated with Level 0 may point to a website that may be, for example, a school website that the child may access without restrictions. Conversely, a Level 4 URL may point to a website featuring mature themes only suitable for some children and a URL that is associated, by the policy server 114, with a Level 5 may point to a website that is to be always blocked and is never to be accessed by any of the client devices 104, 106, 108. According to one embodiment, therefore, the value received by the router 102 may be one of a plurality of values, and each of the plurality of values may correspond to a greater or lesser scope of URL access rights.

Whether the value returned by the policy server 114 is characterized as a Level, a rating or some other indicator, it may be received by the router 102 and evaluated against one or more policies, rules, constraints or heuristics to enable the router 102 to determine whether to allow or disallow access to the requested URL. According to one embodiment, it is the router 102, and not some remote server, that makes the determination whether to allow or disallow access to a URL. Such policies, rules or heuristics (hereafter, collectively, "policies") may be stored within the router 102. Such policies may be initially stored at a second remote site and downloaded to the router 102. For example and with continued reference to FIG. 1, the policies may be stored in and downloaded from a policy control server 112. According to one embodiment, the router 102 may be configured, upon being powered on and starting up, to request one or more policies from the policy control server 112, as shown at 138. Such request may comprise a request for a full set of policies for router 102 or may comprise a request for an incremental update of one or more of the policies stored within the router 102. Responsive to such request, the policy control server 112 may be configured to send and the router 102 may be configured to receive one or more policies for that router 102, as shown at 140. The router 102 may be further configured, according to one embodiment, to periodically poll the policy control server 112 and to download any updates to any policies for the router 102 or any new policies assigned to that router 102. Accordingly, the received policies may comprise a full set of policies for the router 102 or may comprise only updates (if any) to policies that are already stored on the router 102. Having received one or more policies or updates thereto, the router 102 may store them internally to the router 102. Thereafter, upon receipt of a request for access to a URL by a client device 104, 106, 108, the router 102 may apply such locally-stored policy or policies against the received value associated with the requested URL to determine whether the uniquely identified client device having requested the URL to which the received value is associated should be allowed or disallowed access to the requested URL.

The router 102 may be configured, as a result of this application of the received value to the policy or policies, to make the determination to either allow or disallow the requesting client device 104, 106 or 108 to access the requested URL. Therefore, the client devices 104, 106, 108 will succeed in accessing some URLs and not succeed (i.e., be blocked by the router 102) in accessing other URLs, as mediated by the router 102. FIG. 1 shows a number of such URLs at 122, 124, 126, 128 and 130. As shown at 122, one or more of the policies within the router 102 may be configured to designate certain URLs as belonging to a first list of URLs, the access to which is always allowed. Such first list, for example, may be called a "safe list". URL 122 of FIG. 1 is on such a safe list, as shown. Therefore, client devices 104, 106 and 108, according to one embodiment, are always allowed access to URLs on the safe list, such as URL 122. According to another embodiment, access to even URLs on such a safe list may be controlled according to, for example, the time of day, as is described in detail below. Conversely, as shown at 130, one or more of the policies within the router 102 may be configured to designate certain URLs as belonging to a second list of URLs, the access to which is never allowed (always disallowed). Such second list, for example, may be called a "blocked list". URL 130 of FIG. 1 is on such a blocked list, as shown. Therefore, the router 102 may be configured such that client devices 104, 106 and 108, according to one embodiment, are never allowed access to URLs on the blocked list, such as URL 130. According to one embodiment, the safe list may be downloaded from the policy control server 112 and locally stored within the router 102. Similarly, according to one embodiment, the blocked list may also be downloaded from the policy control server 112 and stored locally within the router 102. In this matter, the router may respond to requests for access to URLs that are on either the safe or blocked list without sending the URL to the policy server 114. That is, the router 102 may allow access to URLs on the safe list or disallow access to URLs on the blocked list on its own accord, without sending the URL to which access is requested to the policy server 114. This enables the router 102 to respond to such requests faster than would otherwise be possible had the router 102 been required to send a request to and wait for a response from, the policy server 114.

IN the example being developed in FIG. 1, one of the client devices 104, 106, 108 has requested access to the URL 124. As described above, the router 102 may request a value for URL 124 from the policy server 114. The policy server 114 may be configured to access the database 116, match the URL with a value associated therewith in the database and, in response to the request from the router 102, return the value associated with the requested URL 124 to the router 102. The router 102, according to one embodiment, may have applied the received value against one or more policies applicable to the requesting client device and determined whether to allow access to the URL or disallow access thereto. As suggested at 124, the router 102, through the application of the value to the policy or policies appropriate for the requesting client device, has determined that it will disallow the requesting client device 104, 106, 108 from accessing the URL 124, as suggested by the "X" over URL 124. Conversely, one of the client devices 104, 106, 108 may have requested access to the URL 126. As described above, the router 102, according to one embodiment, may have requested a value for URL 126 from the policy server 114. The policy server 114 may then have accessed the database 116, matched the URL 126 with a value associated therewith in the database 116 and, in response to the request from the router 102, the policy server 114 may have returned and the router 102 may have received, the value associated with the requested URL 126. The router 102 may be configured to, according to one embodiment, apply the received value against one or more policies applicable to the requesting client device and determine whether to allow access to the URL or disallow access thereto. As suggested at 126, the router 102, through the application of the value to the policy or policies appropriate for the requesting client device, has determined that it will allow the requesting client device to access the URL 126. Content accessible through URL 126 may then be fetched by the router 102 and served to the requesting client device 104, 106, 108. Access to other URLs, such as shown at 128 in FIG. 1, may be initially disallowed by the router 102, in a manner similar as that described relative to URL 124. However, access thereto may still be allowed by the router 102 if the disallowed access is thereafter overridden subject to, for example, the satisfaction of predetermined security constraints, as is further described below relative to FIG. 4.

According to one embodiment, the policies stored in the policy control server 112 and downloaded to the router 102, may be pre-configured and/or may be user-configurable. Indeed, according to one embodiment, the policy control server 112 may be remotely accessible to properly authenticated Administrators, an example of which is shown at 118 as "Admin". An Admin 118 may be, for example, a parent, guardian, educator or other responsible party that is given the authority and credentials to access the policy control server 112 through a client device 120, for the purpose of configuring one or more of the policies stored therein. A simple exemplary policy that an Admin 118 may set through client device 120 may be of the form "client device 106 is only to be allowed to access URLs associated with Level 2 from 8:00 am to 9:00 pm and is only to be allowed to access URLs associated with Level 3 or below from 9:01 pm to 10:30 pm on weekdays."

Figure 2:
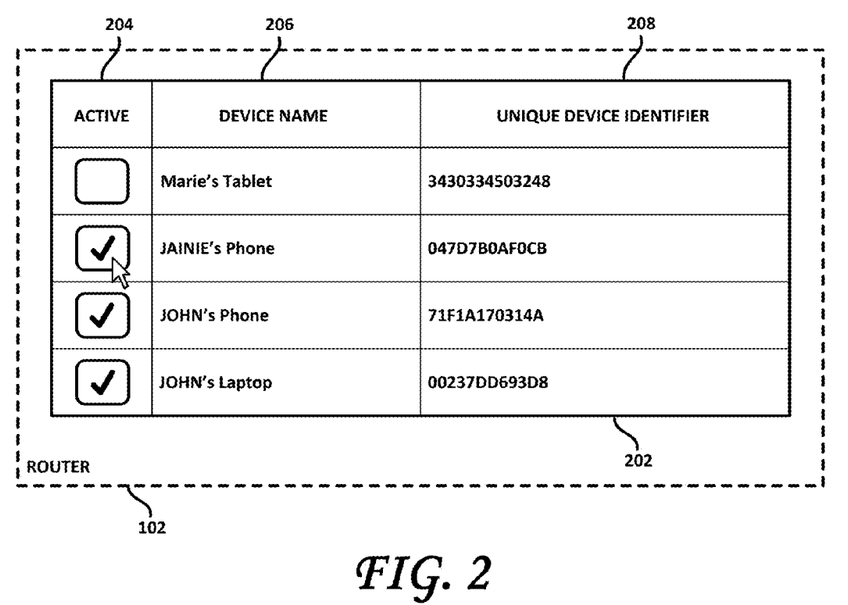
FIG. 2 shows a correspondence table associating device names and unique identifiers, according to one embodiment.

Policies may be broadly applicable to all, a selected number or a single one of the client devices 104, 106, 108. According to one embodiment, client devices may be uniquely identified, and that unique identification may be used to associate policies with one or more client devices. FIG. 2 shows a correspondence table configured to associate client devices and unique identifiers, according to one embodiment. As shown therein, the router 102 (or integrated router-modem 102) may be configured to store and maintain a table or database 202 that stores or references a unique identifier for each of the plurality of client computing devices whose access to URLs and online content is to be controlled. As shown in FIG. 2, the table 202 may comprise, for each client computing device, an entry 204 indicative of whether network access controls are to be imposed for that device. Table 2 also shows at 206 a friendly name ("Marie's Tablet", "Jainie's Phone", etc.) for each of the client devices whose access to the network 110 is to be controlled. At 208, FIG. 2 shows a column comprising a unique device identifier for each of the client computing devices whose access to the network 110 is to be controlled. According to one embodiment, the router 102 may associate the unique device identifiers 208 with the friendly device name 206. According to one embodiment and as shown in FIG. 2, the unique device identifier 208 may comprise a Media Access Control (MAC) address of the client device. The unique device identifier may also comprise or be based on, according to one embodiment, the IP address of the client computing device. Those of skill in this art will recognize that other quantities may be used for a device unique identifier 208. The table or database 202 may be, according to one embodiment, stored in the router 102. It is by associating one or more unique device identifiers with one or more policies that specific policies may be applied to specific client devices 104, 106, 108. One or more policies may be applicable to all client devices 104, 106, 108, whereas others may be applicable to one or more such client devices.

Figure 3:
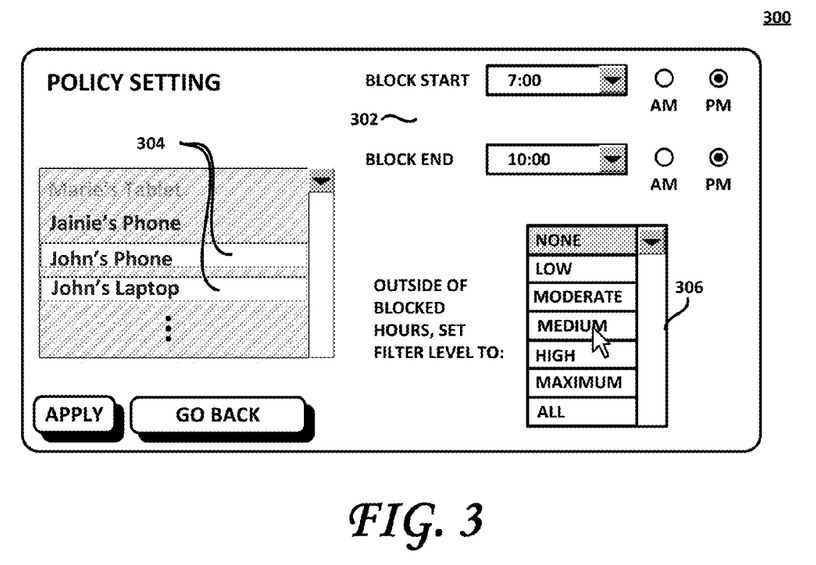
FIG. 3 is a diagram of a User Interface (UI) enabling the setting of policies to control access to the Internet, according to one embodiment.

To customize the policies or to create new policies, the Admin(s) 118 may access the policy control server 112 through his or her client device 120. For example, the UI presented to the Admin 118 by the policy control server 112 may be browser-based. FIG. 3 is a diagram of a UI enabling the setting of policies to control access to the Internet, according to one embodiment. As shown in FIG. 3, the UI 300 may enable the Admin 118 to create a new or modify an existing policy. For example, the Admin may be presented with a drop-down list of friendly device names and may be prompted to select that or those device names to which the new or updated policy is to be associated. By selecting more than one client device, a group of client devices may be formed, in which the constituent members thereof will each be subject to the policy being created or updated. As shown in FIG. 3, John's Phone and John's laptop computer have been selected as shown at and thus form a group 304. As shown at 302, if John's Phone and John's tablet are to be blocked from all Internet access during specific time periods, the Block Start and Block End drop down menu may be used to select the beginning and end times, respectively, of the time period during which no Internet access is to be allowed. Radio buttons or other graphic devices may also be provided, to distinguish between am and pm. In the example shown in FIG. 3, John's Phone and John's Laptop (corresponding to client devices 106 and 108 in FIG. 1, for example) are to be blocked from accessing the Internet during prime homework hours; that is, between 7:00 pm and 10:00 pm in this example. The policy may also establish controls as to the URLs that may be accessed outside of those hours. As shown at 306, the UI 300 may comprise, according to one embodiment, one or more drop down menus enabling the Admin 118 to select filter values that will control access to URLs outside of the hours indicated at 302. As shown, such filter values are set in FIG. 3 as None, Low, Moderate, Medium, High, Maximum or All. It is to be noted that a greater or lesser number of filter values may be implemented. Such filter values, therefore, are one embodiment of the value that is returned to the router 102 at 115 in FIG. 1 as a result of the router 102 requesting a value for a specific URL requested by one of the client devices 104, 106, 108. For example, the filter value of None may be configured to block all access to all URLs, irrespective of any previously set Block Start and Block End settings at 302. This setting effectively cuts off access to the Internet through the router 102. The filter value of All may be set if the policy is to allow the client device subject to this policy access to any and all URLs. According to one embodiment, a filter value of Low, for example, may cause the router 102 to block access to URLs pointing to sites featuring adult-oriented content. A filter value of Moderate, for example, may cause the router 102 to block access to the URLs blocked by the Low filter value, as well as to URLs pointing to sites featuring occult and illegal acts, for example. A filter value of Medium, for example, may be configured to cause the router 102 to block access to the URLs blocked by the Low and Moderate filter values, as well as to URLs pointing to sites featuring mature content. Similarly, a filter value of High, for example, may cause the router 102 to block access to the URLs blocked by the Low, Moderate and Medium filter values, as well as to URLs pointing to sites featuring hate speech, slander, and the like. Lastly, a filter value of Maximum, for example, causes the router 102 to block access to the URLs blocked by the Low, Moderate, Medium and High filter values, as well as to URLs pointing to social networks, video sites, and the like. Those of skill in this art may readily recognize that other filter values and filtering methods may be implemented with the present context. Continuing with the example being developed herewith, the Admin 118, in FIG. 3, has selected the filter value of Medium for John's Phone and Laptop outside of the hours of 7:00 pm to 10:00 pm. Such a policy may, therefore, be associated with the unique identifier of John's Phone (71F1A1703314A—see FIG. 2) and John's Laptop (00237DD693D8). Such a policy may be stored in the policy control server 112 and a copy thereof downloaded, as shown at 140 in FIG. 1, to the router 102, where it may be implemented to control access to URLs requested by John's Laptop and Phone. With reference to FIG. 1, according to one embodiment, the policy control server 112 and the policy server 114 and database 116 may be separate physical or logical entities, or may be different functional parts of a same physical or logical entity configured to carry out the functions described herein.

During normal operations, the router 102, according to one embodiment, may submit each requested URL to the policy server 114 and receive therefrom a corresponding value. However, with reference to FIG. 3, it is to be understood that such submission of a requested URL to the policy server 114 need not take place if the URL requested was made by a client device within the predetermined time window during which access to the Internet is blocked; that is, between the Block Start and Block End times of reference 302. According to one embodiment, the router 102 may be provided with a predetermined amount of memory configured as a cache, as shown at 142 in FIG. 1. Therefore, the router 102 may cache previously-received values for requested URLs for possible future use. Prior to or instead of submitting a URL to the policy server 114 and waiting for the returned value corresponding thereto, the router 102 may be configured to first check its onboard cache 142 for a hit. If a hit occurs—that is, if the requested URL is present in the cache 142, the router 102 may be configured to retrieve the corresponding value from its cache 142, rather than accessing the remote policy server 114. The router 102 may then determine whether to allow or disallow access to a requested URL in a shorter period of time, as compared to the comparatively longer time period necessary to send the request to the policy server 114, for the policy server 114 to match the requested URL with an associated value and return the associated value to the router 102. The router 102 may, according to one embodiment, have to carry out this procedure anyway, if the value associated with a requested URL is not present in the router's cache 142. According to one embodiment, the router's cache 142 may be logically organized as a First-In, First-Out (FIFO) cache memory, meaning that older cache entries may be pushed out by newer cache entries as the cache 142 is populated during use of the router 102.

According to one embodiment, for performance reasons, the router 102 may be configured to first check its local copy of the safe list of URLs and/or to check its local copy of the blocked list of URLs. If the URL to which access is requested is present in either the safe or blocked list, the access may be allowed or disallowed, respectively, without accessing the remote policy server 114. If the URL to which access is requested is not present in either the safe or blocked lists, the router 102 may be configured to check its cache 142 for the requested URL. If an entry comprising the requested URL is present in the cache, indicating that a previous inquiry regarding this URL has been made and the cache 142 not subsequently flushed, a determination may be made by the router 102 whether the value associated with the URL is sufficient to allow the URL-requesting client device to access the URL. If the associated value is determined to be sufficient, access to the URL is allowed. Conversely, if the value associated with the URL, as retrieved from the cache 142 is determined to be insufficient, access to the URL may be disallowed. Sequentially consulting safe and blocked lists and, if the requested URL is not present therein, consulting the cache 142, enables the router 102 to allow or disallow access to URLs without making a request to and waiting for a response from, the policy server 114. According to one embodiment, only when the requested URL is not present in the safe or blocked lists and not present in an entry in the cache 142, may the router 102 send the requested URL to the policy server 114 and receive a value associated therewith in return. Therefore, in many cases, the router 102 may allow or disallow access to a requested URL without accessing a remote site, leading to performance enhancements.

Figure 4:
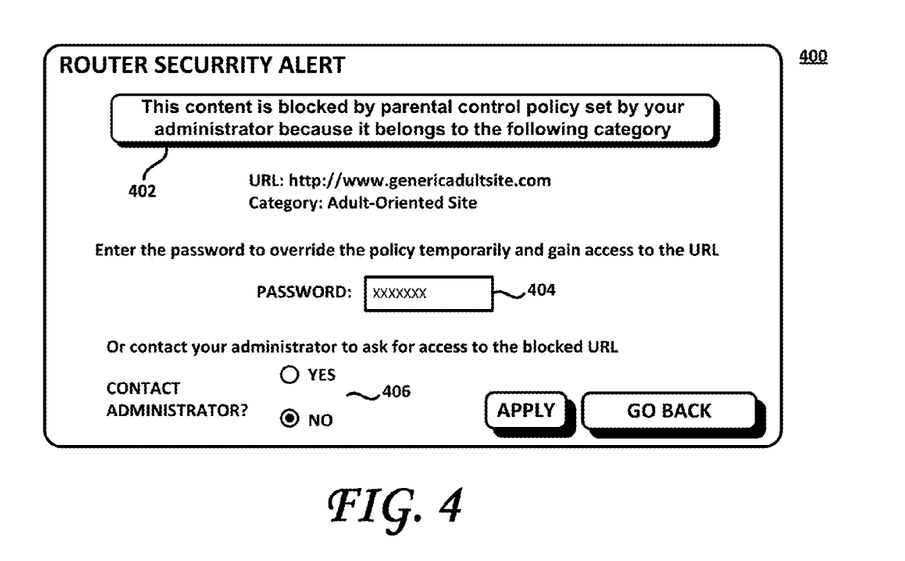
FIG. 4 is a diagram of a UI showing a security alert and giving the user an opportunity to override a disallowed access to a Uniform Resource Locator (URL), according to one embodiment.

As foreshadowed at reference 128 in FIG. 1, an initially disallowed URL access request may be allowed if the disallowed access is overridden. FIG. 4 is a diagram of a UI 400 showing a security alert and giving the user an opportunity to override a disallowed access to a URL, according to one embodiment. The exemplary UI of FIG. 4 may be generated by the router 102 when a client device has requested access to a URL and has been blocked from accessing the same through, for example, the application of a policy against a value associated with this requested URL. As shown, the UI may display a message 402 explaining the reason why the router 102 has disallowed access to the requested URL and may prompt the user to enter a password to override the disallowed access, as shown at 404. Radio buttons may be provided, as shown at 406, enabling the user to contact the Admin 118 for the password 404. The Admin 118 may then exercise his or her own judgment and decide to provide the requested password or withhold same.

Figure 5:
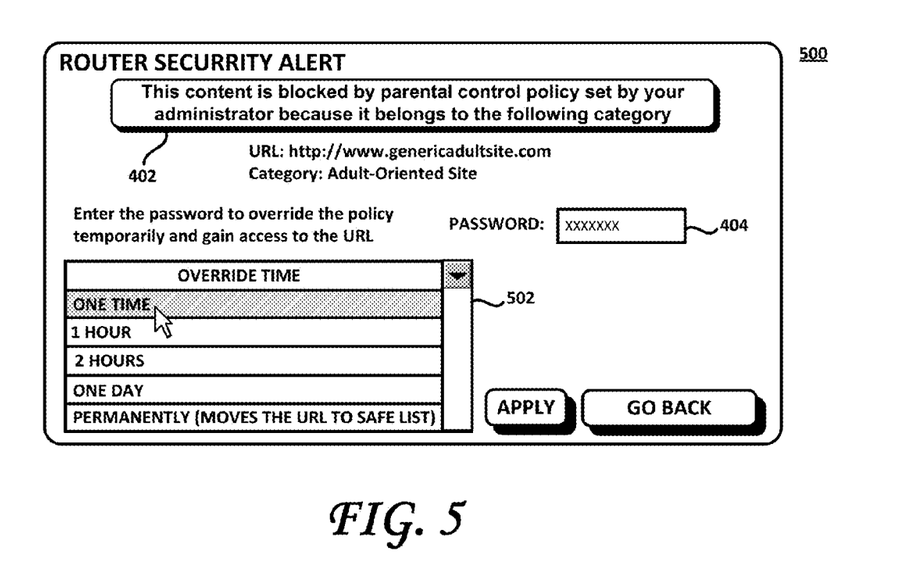
FIG. 5 is a diagram of a UI showing a security alert and giving the user an opportunity to override a disallowed access to a URL for a selectable period of time, according to one embodiment.

FIG. 5 is a diagram of a UI 500 showing a security alert and giving the user an opportunity to override a disallowed access to a URL for a selectable period of time, according to one embodiment. As shown at 502, the UI may comprise a drop-down menu 502 enabling a user having provided the correct password 404 to select the period of time during which the override is to be effective. For example and as shown at 502, the override may be selectively configured to be effective for this instance only ("One Time") or for a predetermined period of time, such as 1 hour, 2 hours or one day. Other time periods may be readily accommodated. As shown, a disallowed request for access to a URL may be permanently overridden, which effectively moves the URL to the safe list.

Figure 6:
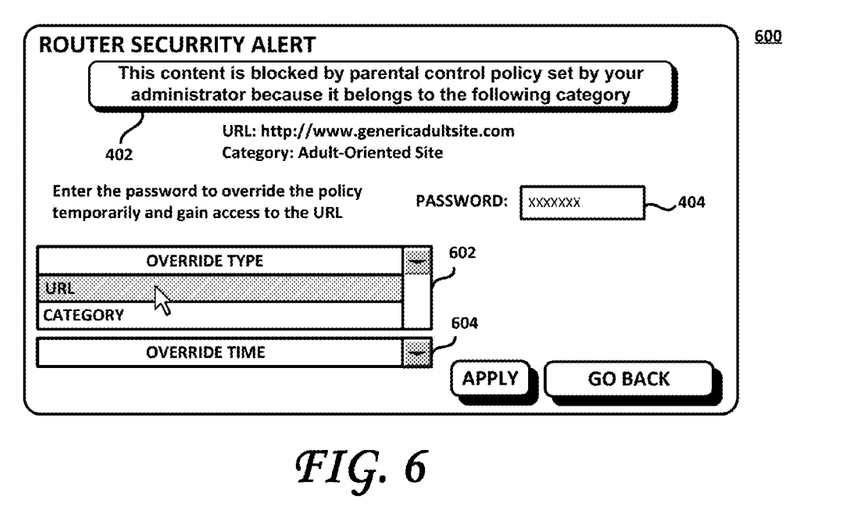
FIG. 6 is a diagram of a UI showing a security alert and giving the user an opportunity to selectively override either a URL or an entire category to which the URL belongs, according to one embodiment.

FIG. 6 is a diagram of a UI 600 showing a security alert and giving the user an opportunity to selectively override either a URL or an entire category to which the URL belongs, according to one embodiment. 14. As shown in FIG. 6 at 602, the router may be configured to enable the selective override of either the URL itself or the category to which the overridden URL belongs. Herein, the term "category" is exemplary, and may encompass any classification to which the value returned from the remote policy server 114 may be mapped. For example, the category may correspond to the value returned by the policy server such that access to all URLs associated with that value-as-category may be allowed, as being overridden. The term "category" may also be associated with specific curated content, such as shown at FIG. 6, in which the category is "Adult-Oriented Site".

Figure 7:
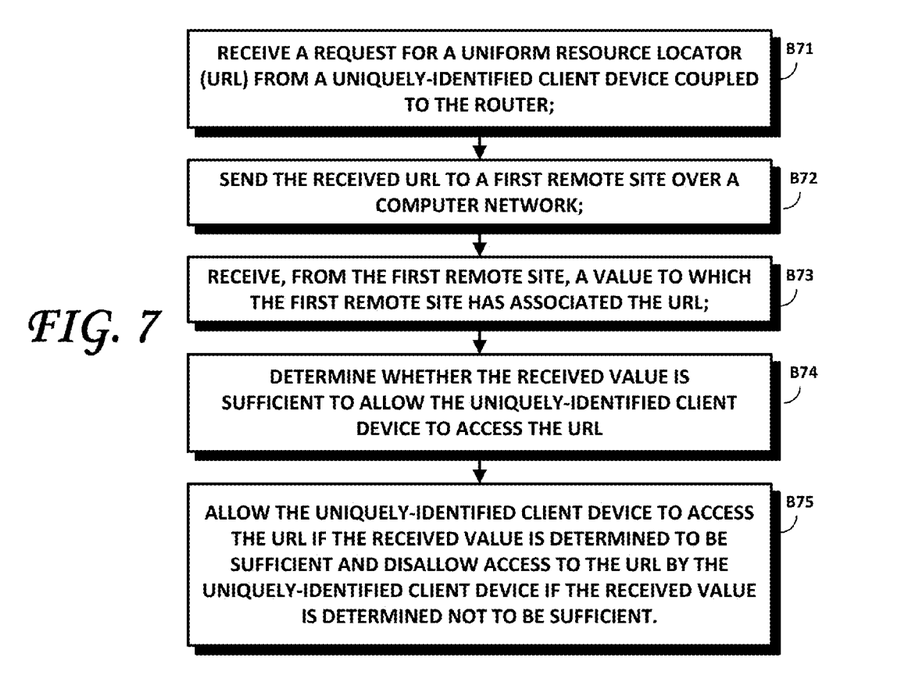
FIG. 7 is a flowchart of a method of operating a router, according to one embodiment.

FIG. 7 is a flowchart of a method of operating a router, according to one embodiment. As shown at block B71, the router 102 may be configured to receive a request for a URL from a uniquely-identified client device coupled to the router. Block B72 calls for the sending of the received URL to a first remote site over a computer network. For example, the first remote site may comprise the policy server 114, shown in FIG. 1. In block B73, the router 102 may receive, from the first remote site, a value to which the first remote site has associated the URL. Such value may be a Level (Low, Medium, Moderate, etc.) or a numerical value (1, 2, 3, 4 . . . ) or any value or quantity that enables the router 102, in combination with the policies, rules and filters stored therein and/or obtained from the policy control server 112, to determine whether to allow or disallow access to the requested URL. Thereafter, in block B74, the router 102 may determine whether the received value is sufficient (e.g., effective or operative) to allow the uniquely-identified client device to access the requested URL. Thereafter, the router 102 may enforce such determination, as shown at block B75, by allowing the uniquely-identified client device to access the requested URL if the received value is determined to be sufficient and by disallowing access to the requested URL by the uniquely-identified client device if the received value is determined not to be sufficient.

Figure 8:
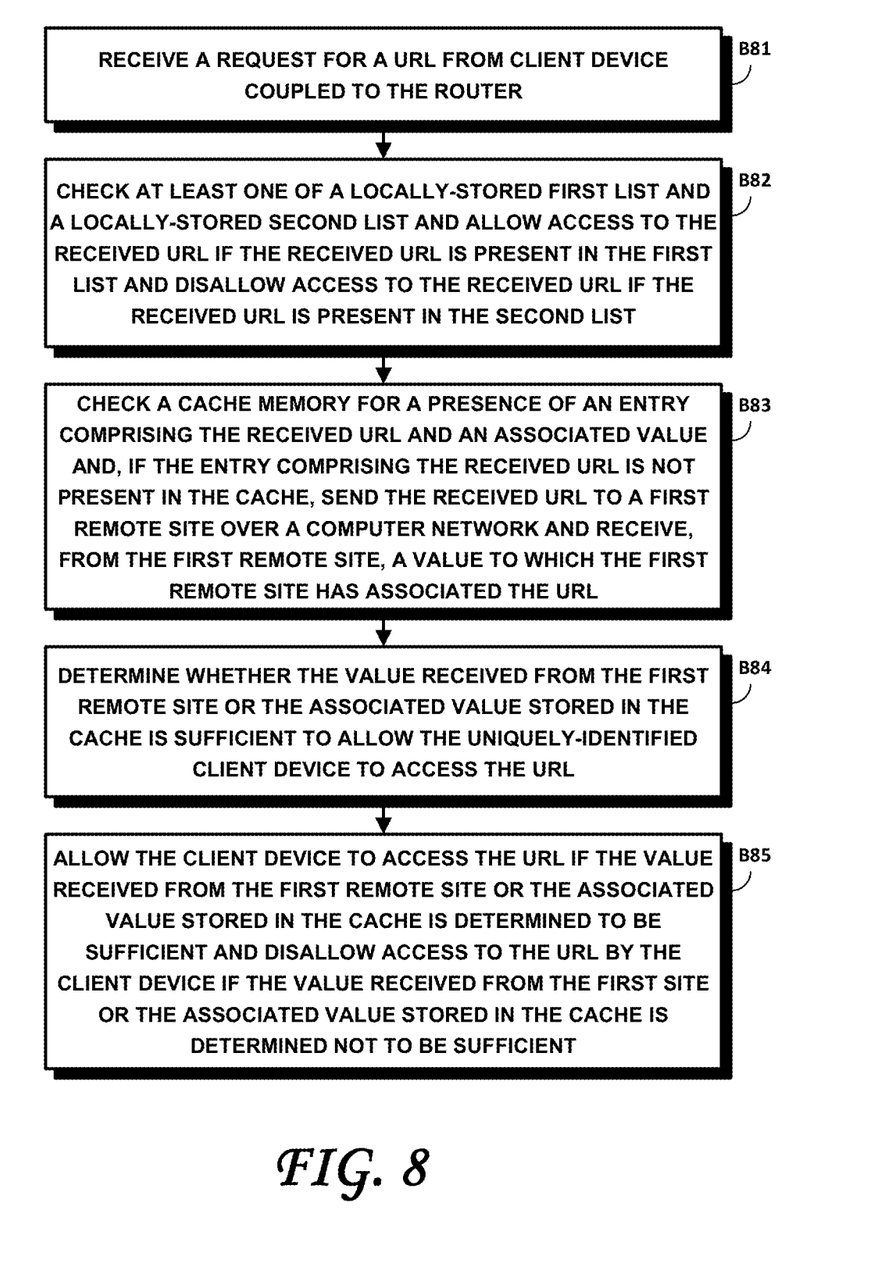
FIG. 8 is a flowchart of a method of operating a router, according to one embodiment.

FIG. 8 is a flowchart of a method of operating a router, according to one embodiment. According to one embodiment, a sequential process may be carried out to first check safe and blocked lists, to then check the cache 142 and only when the requested URL is not present therein, to send the requested URL to the policy server 114 for the purpose of receiving an associated value in return. Such a process has significant performance advantages, as the router may, in certain circumstances, omit sending the requested URL to the remote policy server 114 and may respond to such requests for URL locally and thus more rapidly. As shown, the embodiment of FIG. 8 may comprise receiving a request for a URL from a client device coupled to the router, as shown at block B81. As called for at B82, the router 102 may be configured to first check a locally-stored first list and/or a locally-stored second list and to allow access to the received URL if the received URL is present in the first list and to disallow access to the received URL if the received URL is present in the second list. For example, the first list may be or comprise a safe list and the second list may be or comprise a blocked list. As shown at B83, the router 102 may be configured to then check a cache memory, as shown at 142 in FIG. 1, for the presence of an entry comprising the received URL and an associated value and, if the entry comprising the received URL is not present in the cache, the router 102 may be configured to send the received URL to a first remote site over a computer network and to receive, from the first remote site, a value to which the first remote site has associated the URL. As shown at B84, the router 102 may be configured to then determine whether the value received from the first remote site or the associated value stored in the cache 142 is sufficient to allow the uniquely-identified client device to access the requested URL. The router 102 may also be configured to thereafter allow the client device to access the requested URL if the value received from the first remote site or the associated value stored in the cache 142 is determined to be sufficient and to disallow access to the requested URL by the client device if the value received from the first site or the associated value stored in the cache is determined not to be sufficient, as shown at B85.

According to one embodiment, the router 102 may access the policy server 114 each time a URL is requested by a client device accessing the network being serviced by the router 102. Such a URL-based access control through the router 102 requires all URLs accessed by devices within the network to be "vetted" by the policy server(s) 116 for compliance with the customizable policies and filters. This provides safe surfing of web for underage users by setting certain parameters for access to certain web sites. The Admin(s), such as parents or guardians, authenticated via, for example, a username and password combination, may set the filtering policy or policies in the remote policy control server 112, thereby enabling the Admin 118 to manage such policies even when the Admin 118 is remote from the home Local Area Network (LAN). According to one embodiment, therefore, the policies and filters may be set by a properly authenticated Admin from anywhere through a browser. According to one embodiment, the router 102 may first consult on-board resources such as lists and caches, in an attempt to locally determine whether to allow or disallow access to the requested URL and only in the event that the on-board resources are unable to inform such determination may the router 102 consult remote resources such as the policy server 114.

According to one embodiment, by bringing access control decisions into the router 102, and the policy/filter administration away from either the client devices 104, 106, 108 or the router 102, there is less potential for circumvention by the children than would otherwise be the case. In this manner, the router 102 becomes not only the gateway to the network 110 but also an effective, inflexible (from the children's point of view) access arbiter capable of fine-grained distinctions between client devices and the content each such client device is to be allowed access. One embodiment, therefore, does not rely on installing client software on disparate and constantly evolving panoply of desktop computers, laptops, mobile devices and gaming consoles within the home.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the actual structures (such as, for example) may differ from those shown in the figures. Depending on the embodiment, certain of the steps described in the example above may be removed, others may be added. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:
1. A router, comprising:
a memory, the memory being configured to store a plurality of instructions; and
a processor coupled to the memory, wherein the processor is configured to execute the plurality of instructions, the execution of the plurality of instructions configuring the router to:
download, from a policy control server, at least one policy;
associate the at least one policy to each uniquely-identified client device coupled to the router;
receive a request for a Uniform Resource Locator (URL) from a uniquely-identified client device coupled to the router;
send the received URL to a remote site over a computer network;
responsive to having sent the URL to the remote site, receive, from the remote site, a value to which the remote site has associated the URL, the value being one of a plurality of values, each of the plurality of values corresponding to a greater or lesser scope of URL access rights associated with the uniquely-identified client device;

apply the received value to the at least one policy associated with the uniquely-identified device from which the URL request was received to determine whether the received value is sufficient for the associated policy to allow the uniquely-identified client device to access the URL;

allow the uniquely-identified client device to access the URL if the received value, as applied to the at least one associated policy, is determined to be sufficient;

disallow access to the URL by the uniquely-identified client device if the received value, as applied to the at least one associated policy, is determined not to be sufficient; and periodically poll the policy control server and download at least a portion of the at least one policy from the policy control server if the at least one policy has been updated.

2. The router of claim 1, wherein the execution of the plurality of instructions further configures the router to determine whether the received value identifies the URL as belonging to a first list of URLs, the access to which is always allowed.

3. The router of claim 2, wherein the execution of the plurality of instructions further configures the router to:
download and locally store, in the router, the first list from the remote site; and
thereafter, allow access to a later-requested URL without sending the later-requested URL to the remote site if the later-requested URL is present in the first list.

4. The router of claim 1, wherein the execution of the plurality of instructions further configures the router to determine whether the received value identifies the URL as belonging to a second list of URLs, the access to which is never allowed.

5. The router of claim 4, wherein the execution of the plurality of instructions further configures the router to:
download and locally store, in the router, the second list from the remote site; and
thereafter, disallow access to a later-requested URL without sending the later-requested URL to the remote site if the later-requested URL is present in the second list.

6. The router of claim 1, wherein the execution of the plurality of instructions further configures the router to disallow access to the URL without sending the received URL to the remote site if the request for the URL was received outside of a predetermined time window.

7. The router of claim 1, wherein the at least one policy comprises at least one entry specific to the uniquely-identified client device.

8. The router of claim 1, wherein the execution of the plurality of instructions further configures the router to uniquely identify the client device using at least a Media Access Control (MAC) of the client device.

9. The router of claim 1, wherein the execution of the plurality of instructions further configures the router to enable a selective override of a disallowed access to thereby enable the uniquely-identified client device to access the requested URL after the disallowed access has been overridden.

10. The router of claim 9, wherein the selective override is configured to enable an overridden URL to be one of added to a first list of URLs, the access to which is always allowed and added to a second list of URLs, the access to which is always disallowed.

11. The router of claim 9, wherein the selective override is configured to enable a category to which the overridden URL belongs to be one of added to a first list of categories of URLs, the access to which is always allowed and added to a second list of categories of URLs, the access to which is always disallowed.

12. The router of claim 1, wherein the memory is a volatile memory, and wherein the router further comprises a non-volatile memory configured to store the plurality of instructions, and wherein the processor is further configured to, upon startup of the router, load a copy of the plurality of instructions stored in the non-volatile memory into the volatile memory.

13. The router of claim 1, further comprising a modem.

14. A method of operating a router, comprising:
downloading, over a computer network, at least one policy from a remote policy control server;
associating the at least one policy to each uniquely-identified client device coupled to the router;
receiving a request for a Uniform Resource Locator (URL) from a uniquely-identified client device coupled to the router;
sending the received URL to a remote site over the computer network;
responsive to having sent the URL to the remote site, receiving, from the remote site, a value to which the remote site has associated the URL, the value being one of a plurality of values, each of the plurality of values corresponding to a greater or lesser scope of URL access rights associated with the uniquely-identified client device;
applying the received value to the at least one policy associated with the uniquely-identified device from which the URL request was received to determine whether the received value is sufficient for the associated policy to allow the uniquely-identified client device to access the URL;
allowing the uniquely-identified client device to access the URL if the received value, as applied to the at least one associated policy, is determined to be sufficient;
disallowing access to the URL by the uniquely-identified client device if the received value, as applied to the at least one associated policy, is determined not to be sufficient; and
periodically polling the remote policy control server over the computer network and downloading at least a portion of the at least one policy from the policy control server if the at least one policy has been undated.

15. The method of claim 14, further comprising determining whether the received value identifies the URL as belonging to a first list of URLs, the access to which is always allowed.

16. The method of claim 15, further comprising:
downloading and locally storing, in the router, the first list from the remote site; and
thereafter, allowing access to a later-requested URL without sending the later-requested URL to the remote site if the later-requested URL is present in the first list.

17. The method of claim 14, further comprising determining whether the received value identifies the URL as belonging to a second list of URLs, the access to which is never allowed.

18. The method of claim 17, further comprising:
downloading and locally storing, in the router, the second list from the remote site; and
thereafter, disallowing access to a later-requested URL without sending the later-requested URL to the remote site if the later-requested URL is present in the second list.

19. The method of claim 14, further comprising disallowing access to the URL without sending the received URL to the remote site if the request for the URL was received outside of a predetermined time window.

20. The method of claim 14, wherein the first and second remote sites are a same remote site.

21. The method of claim 14, wherein the at least one policy comprises at least one entry specific to the uniquely-identified client device.

22. The method of claim 14, further comprising uniquely identifying the client device using at least a Media Access Control (MAC) of the client device.

23. The method of claim 14, further comprising enabling a selective override of a disallowed access to thereby enable the uniquely-identified client device to access the requested URL after the disallowed access has been overridden.

24. The method of claim 23, wherein the selective override is configured to enable an overridden URL to be one of added to a first list of URLs, the access to which is always allowed and added to a second list of URLs, the access to which is always disallowed.

25. The method of claim 23, wherein the selective override is configured to enable a category to which the overridden URL belongs to be one of added to a first list of categories of URLs, the access to which is always allowed and added to a second list of categories of URLs, the access to which is always disallowed.

26. A tangible machine-readable data storage device having data stored thereon representing sequences of instructions which, when executed by a router, causes the router to:
download, over a computer network, at least one policy from a remote policy control server;
associate the at least one policy to each uniquely-identified client device coupled to the router;
receive a request for a Uniform Resource Locator (URL) from a uniquely-identified client device coupled to the router;
send the received URL to a remote site over the computer network;
responsive to having sent the URL to the remote site, receive, from the remote site, a value to which the remote site has associated the URL, the value being one of a plurality of values, each of the plurality of values corresponding to a greater or lesser scope of URL access rights associated with the uniquely-identified client device;
apply the received value to the at least one policy associated with the uniquely-identified device from which the URL request was received to determine whether the received value is sufficient for the associated policy to allow the uniquely-identified client device to access the URL; and
allow the uniquely-identified client device to access the URL if the received value, as applied to the at least one associated policy, is determined to be sufficient;
disallow access to the URL by the uniquely-identified client device if the received value, as applied to the at least one associated policy, is determined not to be sufficient; and
periodically poll the remote policy control server over the computer network and download at least a portion of the at least one policy from the policy control server if the at least one policy has been undated.

27. A method of operating a router, comprising:
downloading, over a computer network, at least one policy from a remote policy control server;
associating the at least one policy to each uniquely-identified client device coupled to the router;
receiving a request for a Uniform Resource Locator (URL) from a client device coupled to the router;
checking at least one of a locally-stored first list and a locally-stored second list and allowing access to the received URL if the received URL is present in the first list and disallowing access to the received URL if the received URL is present in the second list;
checking a cache memory for a presence of an entry comprising the received URL and an associated value and, if the entry comprising the received URL is not present in the cache, sending the received URL to a remote site over the computer network and, responsive to having sent the URL to the remote site, receiving, from the remote site, a value to which the remote site has associated the URL, the value being one of a plurality of values, each of the plurality of values corresponding to a greater or lesser scope of URL access rights associated with the uniquely-identified client device;
applying the received value to the at least one policy associated with the uniquely-identified device from which the URL request was received to determine whether the value received from the remote site or the associated value stored in the cache is sufficient for the associated policy to allow the uniquely-identified client device to access the URL;
allowing the client device to access the URL if the value received from the remote site or the associated value stored in the cache, as applied to the at least one associated policy, is determined to be sufficient;
disallowing access to the URL by the client device if the value received from the first site or the associated value stored in the cache, as applied to the at least one associated policy, is determined not to be sufficient; and
periodically polling the remote policy control server over the computer network and downloading at least a portion of the at least one policy from the policy control server if the at least one policy has been undated.

28. A router, comprising:
a memory, the memory being configured to store a plurality of instructions;
a cache memory; and
a processor coupled to the memory and to the cache memory, wherein the processor is configured to execute the plurality of instructions, the execution of the plurality of instructions configuring the router to:
download, over a computer network, at least one policy from a remote policy control server;
associate the at least one policy to each uniquely-identified client device coupled to the router;
receive a request for a Uniform Resource Locator (URL) from a client device coupled to the router;
check at least one of a locally-stored first list and a locally-stored second list and allow access to the received URL if the received URL is present in the first list and disallow access to the received URL if the received URL is present in the second list;
check the cache memory for a presence of an entry comprising the received URL and an associated value and, if the entry comprising the received URL is not present in the cache, send the received URL to a remote site over the computer network and, responsive to having sent the URL to the remote site, receive, from the remote site, a value to which the remote site has associated the URL, the value being one of a plurality of values, each of the plurality of values corresponding to a greater or lesser scope of URL access rights associated with the uniquely-identified client device;

apply the received value to the at least one policy associated with the uniquely-identified device from which the URL request was received to determine whether the value received from the remote site or the associated value stored in the cache is sufficient for the associated policy to allow the uniquely-identified client device to access the URL;

allow the client device to access the URL if the value received from the remote site or the associated value stored in the cache, as applied to the at least one associated policy, is determined to be sufficient;

disallow access to the URL by the client device if the value received from the first site or the associated value stored in the cache, as applied to the at least one associated policy, is determined not to be sufficient; and periodically poll the remote policy control server over the computer network and download at least a portion of the at least one policy from the policy control server if the at least one policy has been updated.

* * * * *